(12) United States Patent
Adam et al.

(10) Patent No.: US 11,916,505 B2
(45) Date of Patent: Feb. 27, 2024

(54) METHOD FOR OPERATING A DRIVE DEVICE FOR A MOTOR VEHICLE, AND CORRESPONDING DRIVE DEVICE

(71) Applicant: AUDI AG, Ingolstadt (DE)

(72) Inventors: Martin Adam, Ingolstadt (DE); Alexander Tkatschenko, Schernfeld (DE)

(73) Assignee: AUDI AG, Ingolstadt (DE)

( * ) Notice: Subject to any disclaimer, the term of this patent is extended or adjusted under 35 U.S.C. 154(b) by 35 days.

(21) Appl. No.: 17/185,794

(22) Filed: Feb. 25, 2021

(65) Prior Publication Data

US 2021/0273594 A1    Sep. 2, 2021

(30) Foreign Application Priority Data

Feb. 27, 2020  (DE) .......................... 102020105163.8

(51) Int. Cl.
*H02P 27/08*    (2006.01)

(52) U.S. Cl.
CPC ................................. *H02P 27/085* (2013.01)

(58) Field of Classification Search
CPC .. F24C 15/2035; F24C 15/2042; H02P 27/08; H02P 27/00; H02P 27/04; H02P 27/06; H02P 6/00; H02P 6/08; H02P 6/10; H02P 6/12; H02P 1/00; H02P 1/16; H02P 1/24; H02P 1/26; H02P 1/42; H02P 1/46; H02P 7/29; H02P 29/00; H02P 29/032; H02P 2101/45; H02P 25/086; H02P 25/107; H02P 25/062; H02P 25/064; H02P 21/00; H02P 21/00003; H02P 21/20; H02P 21/22; H02P 23/00; H02P 23/07; H02P 23/02; H02P 21/02; B60L 2210/40; B60L 2240/423; B60L 2240/527; B60L 50/51; B60L 58/20; B62D 5/046; H02M 7/5395
USPC .......................................................... 318/503
See application file for complete search history.

(56) References Cited

U.S. PATENT DOCUMENTS

| | | | |
|---|---|---|---|
| 6,023,417 A | 2/2000 | Hava et al. | |
| 2009/0179608 A1* | 7/2009 | Welchko | H02M 7/53875 318/811 |
| 2011/0149621 A1 | 6/2011 | Damson et al. | |
| 2013/0193897 A1 | 8/2013 | Iwashita et al. | |
| 2018/0152123 A1 | 5/2018 | Zhang et al. | |

(Continued)

FOREIGN PATENT DOCUMENTS

| | | | |
|---|---|---|---|
| DE | 102008040144 A1 | | 1/2010 |
| DE | 102013001387 A1 | | 8/2013 |
| DE | 102017127780 | * | 11/2016 |

(Continued)

*Primary Examiner* — Antony M Paul
(74) *Attorney, Agent, or Firm* — Seed IP Law Group LLP

(57) ABSTRACT

A method for operating a drive device for a motor vehicle is provided, wherein the drive device has an electric machine which is electrically connected to a DC power source via an inverter controlled by means of pulse width modulation. The pulse width modulation is performed depending on a predetermined duty cycle. When the duty cycle that is less than a threshold value, a continuous pulse width modulation is used to control the inverter. The pulse width modulation is switched to a discontinuous pulse width modulation when the threshold value is exceeded. A motor vehicle and a drive device for a motor vehicle are also provided.

9 Claims, 3 Drawing Sheets

(56) References Cited

U.S. PATENT DOCUMENTS

2018/0175627 A1* 6/2018 Woodburn ............ B64D 33/00

FOREIGN PATENT DOCUMENTS

DE 102017208093 A1 11/2018
KR 3082247 * 3/2016

* cited by examiner

METHOD FOR OPERATING A DRIVE DEVICE FOR A MOTOR VEHICLE, AND CORRESPONDING DRIVE DEVICE

BACKGROUND

Technical Field

The present disclosure relates to a method for operating a drive device for a motor vehicle, wherein the drive device has an electric machine which is electrically connected to a DC power source via an inverter controlled by means of pulse width modulation, wherein the pulse width modulation is performed depending on a predetermined duty cycle. The present disclosure furthermore relates to a drive device for a motor vehicle.

Description of the Related Art

The publication DE 10 2017 208 093 A1, for example, is known from the prior art. This describes a method for operating an electric machine, wherein an inverter of the electric machine is controlled by means of pulse width modulation. It is thereby provided that a duty factor for the pulse width modulation is determined from a nominal rotational speed-dependent voltage variable and a time-dependent angle variable.

BRIEF SUMMARY

The present disclosure proposes a method for operating a drive device for a motor vehicle which has advantages relative to known methods, in particular makes it possible to provide a greater drive power.

This is achieved according to the present disclosure with a method for operating a drive device for a motor vehicle. It is provided that, at a duty cycle that is less than a threshold value, a continuous pulse width modulation is used to control the inverter, and a discontinuous pulse width modulation is switched to if the threshold value is exceeded.

The drive device is used to drive the motor vehicle; to this extent, it thus provides a drive torque directed at driving the motor vehicle. To provide the drive torque, the drive device has an electric machine, which inasmuch may also be referred to as a traction machine. The electric machine is operated with electrical energy provided by a DC power source. The DC power source is present in the form of a battery, for example. The DC power source preferably has a rated voltage of at least 100 V in some embodiments, at least 200 V in some embodiments, at least 400 V in some embodiments, at least 600 V in some embodiments, or at least 800 V in some embodiments.

The electric machine is present in the form of a three-phase current machine. Accordingly, the inverter, which is preferably designed as a pulse-controlled inverter, is utilized for its operation. The electric machine is electrically connected to the DC power source via the inverter. The inverter has in particular a B6 bridge circuit which has at least six switches that are controlled alternately in order to generate the three-phase current for operating the electric machine from the direct current provided by the DC power source.

The control of the inverter takes place by pulse width modulation. A duty cycle is hereby predetermined, and the pulse width modulation is performed depending on this duty cycle. A linear control range of the inverter is directly dependent on a locking time or dead time of the inverter, or of switches of the inverter. The longer the locking time, the smaller the linear control range. However, the drive power provided by the electric machine is directly proportional to the length of the linear modulation range of the inverter. In other words, the drive power of the electric machine is limited by the locking time of the inverter.

For this reason, the linear modulation range is increased with the aid of the described method, namely preferably by up to half of the locking time. It is provided to use the continuous pulse width modulation to control the inverter at the duty cycle that is smaller than the threshold value. Given a low duty cycle, the control of the electric machine should therefore take place in such a way that it operates as efficiently as possible.

If, in contrast, the predetermined duty cycle exceeds the threshold value, the continuous pulse width modulation is switched to the discontinuous pulse width modulation. The use of the discontinuous pulse width modulation produces an increase of the linear modulation range of the inverter, since the distance between the linear range of a curve of the output voltage of the inverter resulting from the duty cycle and the rated voltage increases for a given duty cycle. A further rise in the duty cycle is therefore possible with the aid of the discontinuous pulse width modulation.

In other words, the type of pulse width modulation is selected and implemented depending on the duty cycle. When the drive device is started up, the inverter is initially operated in a normal operating mode in which it is controlled with the aid of the continuous pulse width modulation. If the predetermined duty cycle reaches or exceeds the threshold, the normal operating mode is switched to a power operating mode to operate the inverter. In the power operating mode, the inverter is controlled with the discontinuous pulse width modulation so that the increase of the linear modulation range of the inverter results as described in the preceding. The drive power of the electric machine and with the drive device may hereby be significantly increased.

In one embodiment, space vector modulation is used as a continuous pulse width modulation. The space vector modulation enables a higher effective voltage at the electric machine in comparison with, for example, sinusoidal pulse width modulation. The space vector modulation may also be referred to as SVM or SVPWM. The described procedure enables an effective and efficient operation of the drive device.

In one embodiment, given discontinuous pulse width modulation, a clamping is implemented over a specific rotation angle range of the electric machine. Thus, no pulse width modulation in the actual sense takes place within the specific rotation angle; rather, at least one switch of the electric machine remains closed across the specific rotation angle range. A distinct increase in the effective voltage which is applied to the electric machine hereby results. At the same time, at a given duty cycle, the distance between the linear range of the curve of the voltage which is present outside of the specific rotation angle and the rated voltage of the DC power source increases. Increasing the linear range of the voltage is possible by increasing the duty cycle, so that the increase of the linear modulation range results in the manner already described.

In one embodiment, the clamping takes place, in particular symmetrically, over a rotation angle range of 60° or 120°. In the case of the rotation angle of 60°, the clamping is therefore performed only over a portion of the respective phase, namely over half the phase. By contrast, if the rotation angle range of 120° is used, the clamping is performed over the entire respective phase. In contrast to the rotation angle range of 120°, for the rotation angle range of 60° the clamping is possible both in the higher voltage range of the phase voltage and in the lower voltage range of the phase voltage. By contrast, if the rotation angle range of 120° is used, the clamping is performed either for the higher voltage range or for the lower voltage range. In any event, the increase of the linear modulation range results via the clamping.

In one embodiment, for a plurality of duty cycles, a first distortion value is determined for the continuous pulse width modulation and a second distortion level is determined for the continuous pulse width modulation, wherein the threshold value is set equal to that duty cycle for which the second distortion level is better than the first distortion value. For example, all possible duty cycles are run through, in particular at constant intervals. It may therefore be provided that, starting from a duty cycle of 0, the duty cycle is increased until it reaches a maximum duty cycle, in particular of 1.

The increase thereby takes place by incrementing by a constant value. The first distortion value and the second distortion value are determined for each of these duty cycles. The respective first distortion value and the second distortion value are thus associated with each of the duty cycles. From these duty cycles, that duty cycle is now chosen for which the second distortion value is better than the first distortion value. The lowest duty cycle to which the cited condition applies is particularly preferably searched for.

The distortion value is to be understood as meaning a value which defines the distortion of the phase voltage resulting from the respective duty cycle. The distortion hereby describes in particular the influence of harmonics on the phase voltage. The condition that the second distortion value should be better than the first distortion value is to be understood as meaning that the second distortion value describes a lower distortion, or less of an influencing of the phase voltage by harmonics, than the first distortion value. Depending on the definition of the distortion value, this may increase or decrease with increasing distortion. If it increases, the condition is met if the second distortion value is smaller than the first distortion value. By contrast, if it decreases, the condition is met if the second distortion value is greater than the first distortion value.

The described procedure is particularly preferably implemented by means of a test stand, that is to say in advance of a start-up of the drive device. The drive device itself may hereby be used, or a drive device which is structurally identical to the drive device. In each instance, with the aid of the described method the threshold value is determined and stored in the drive device. In this way, a particularly clear increase of the linear modulation range is possible, since the threshold value is adapted to the drive device or to the electric machine of the drive device.

In one embodiment, a distortion factor or a Weighted Total Harmonic Distortion value (WTHD value) is used as distortion value. The distortion factor is calculated, for example, on the basis of the relationship $$k = \sqrt{\frac{\sum_{n=2}^{\infty} U_n^2}{\sum_{n=1}^{\infty} U_n^2}} = \frac{\sqrt{U^2 - U_1^2}}{U},$$

wherein the voltage U corresponds to the phase voltage, and the voltage Un describes its fundamental oscillation for n=1 and its harmonics for n>1.

By contrast, the Weighted Total Harmonic Distortion value results, for example, from the relationship $$WTHD = \frac{1}{U_1}\left[\sum_{n=2}^{\infty}\left(\frac{U_n}{n}\right)^2\right]^{1/2}.$$

The distortion factor or the WTHD value enable a particularly effective determination of the threshold value.

In one embodiment, the threshold value is a first threshold value and, upon falling below a second threshold value that is different from the first threshold value, the discontinuous pulse width modulation is switched to the continuous pulse width modulation. In principle, it may of course be provided that the threshold value is used both for switching from the continuous pulse width modulation to the discontinuous pulse width modulation and for switching from the discontinuous pulse width modulation to the continuous pulse width modulation. When the threshold value is exceeded by the duty cycle, the former is switched to the latter; when the duty cycle falls below the threshold value, the switch is from the latter to the former.

However, the switching is advantageously performed at different values. Thus, the switch from the continuous pulse width modulation to the discontinuous pulse width modulation occurs only when the first threshold value is exceeded by the duty cycle; however, by contrast the switching from the discontinuous pulse width modulation to the continuous pulse width modulation takes place only when the duty cycle falls below the second threshold value. The second threshold value is hereby different from the first threshold value, in particular is smaller. The switching is hereby performed with a hysteresis, so that even with small variations in the duty cycle around the threshold value, there is not a continual switching between the continuous pulse width modulation and the discontinuous pulse width modulation or vice versa. A particularly efficient operation of the drive device is hereby realized.

In one embodiment, the duty cycle is determined depending on a nominal value taking into account dead times of switches of the inverter. The switches of the inverter have the dead times in order to prevent a shorting of the DC power source via the inverter. Inasmuch, the dead times ensure that the at least two switches of one phase are not closed at the same time; rather, one of the switches is closed only when the respective other one of the switches is reliably open. This reduces the maximum possible duty cycle, and consequently the maximum possible phase voltage during the control of the inverter by means of the continuous pulse width modulation. However, a high drive power of the drive device may nevertheless be achieved via the at least intermittent operation of the inverter with the discontinuous pulse width modulation.

In one embodiment, a maximum duty cycle and a minimum duty cycle are determined from the dead times, wherein the discontinuous pulse width modulation is switched to when the duty cycle reaches the maximum duty cycle and/or the minimum duty cycle. The switching from the continuous pulse width modulation to the discontinuous pulse width modulation thus does not take place exclusively on the basis of the threshold value, but additionally on the basis of the maximum duty cycle or the minimum duty cycle.

The maximum duty cycle and the minimum duty cycle result from the dead times. In particular, the maximum duty cycle is less than 1 and the minimum duty cycle is greater than 0. The maximum duty cycle and the minimum duty cycle describe the duty cycle which can be maximally or minimally present if the dead times of the switches of the inverter are taken into account. If the duty cycle has reached the maximum duty cycle or the minimum duty cycle, respectively, the linear modulation range has been exhausted and no further increase of the drive power of the electric machine may be achieved using the continuous pulse width modulation. In order to nevertheless achieve a further increase of the drive power, it is therefore switched to discontinuous pulse width modulation. This results in a higher drive power of the drive device.

The disclosure furthermore relates to a drive device for a motor vehicle, in particular for implementing the method according to the statements within the scope of this description, having an electric machine which is electrically connected to a DC power source via an inverter controlled by means of pulse width modulation, wherein the drive device is provided and designed to implement the pulse width modulation depending on a predetermined duty cycle. It is thereby provided that the drive device is additionally provided and designed to use a continuous pulse width modulation to control the inverter at a duty cycle that is less than a threshold value, and to switch to a discontinuous pulse width modulation when the threshold value is exceeded.

The advantages of such a design of the drive device or such an approach have already been pointed out. Both the drive device and the method for its operation may be further developed in accordance with the statements within the scope of this description, such that these are referenced in this respect.

BRIEF DESCRIPTION OF THE SEVERAL VIEWS OF THE DRAWINGS

Principles of the present disclosure are explained in more detail below with reference to the exemplary embodiments shown in the drawings, without limiting the present disclosure.

DETAILED DESCRIPTION

Figure 1:
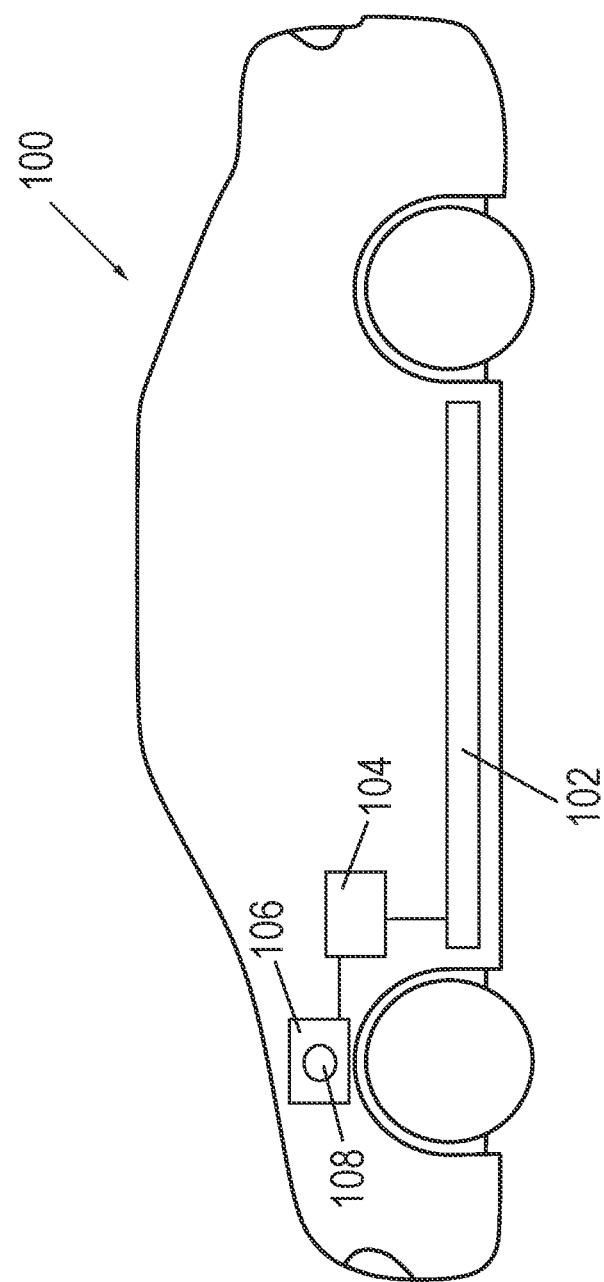
FIG. 1 shows an example of a motor vehicle according to the present disclosure.
Figure 2:
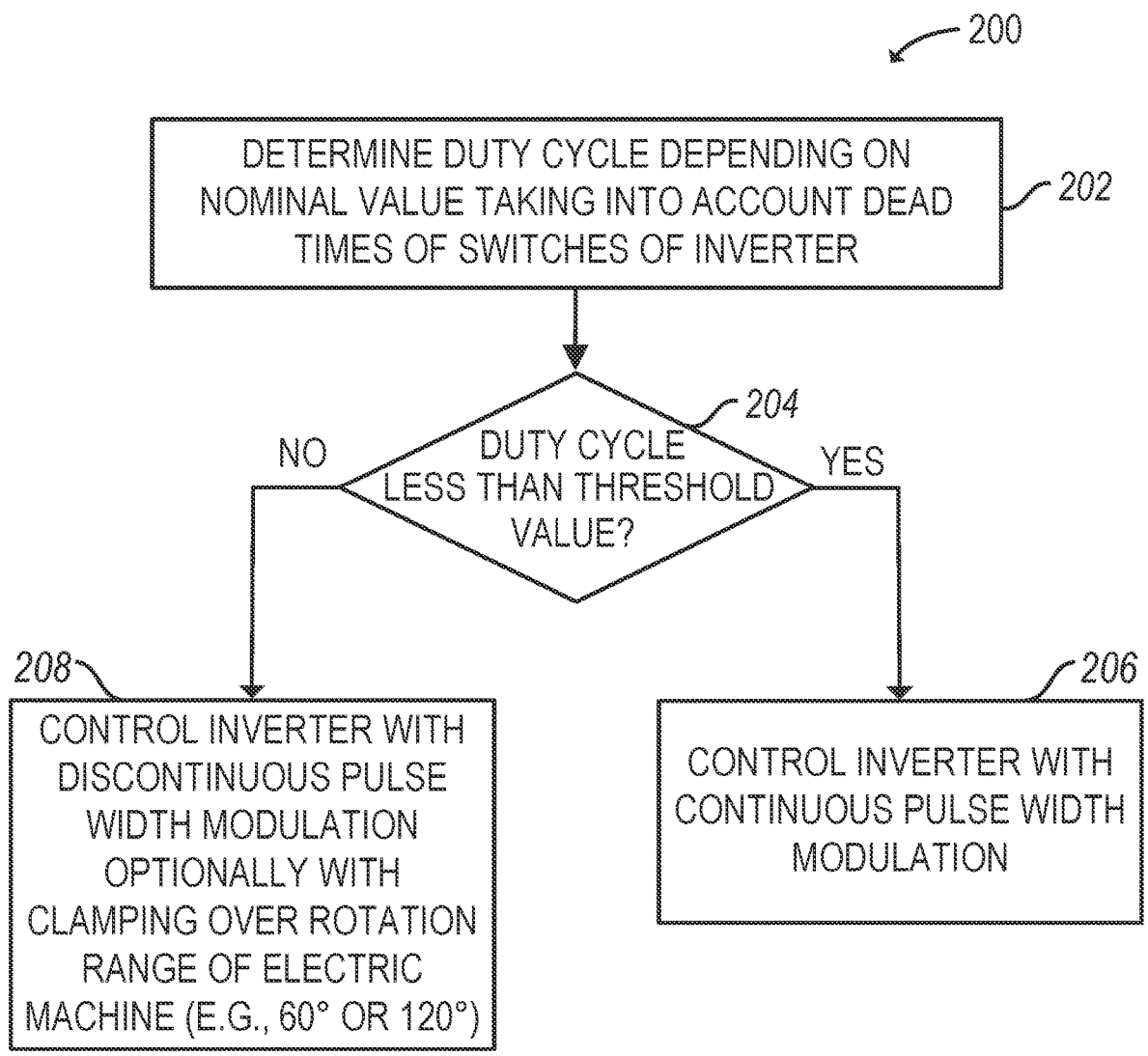
FIG. 2 shows a flowchart of an example of a method according to the present disclosure.
Figure 3:
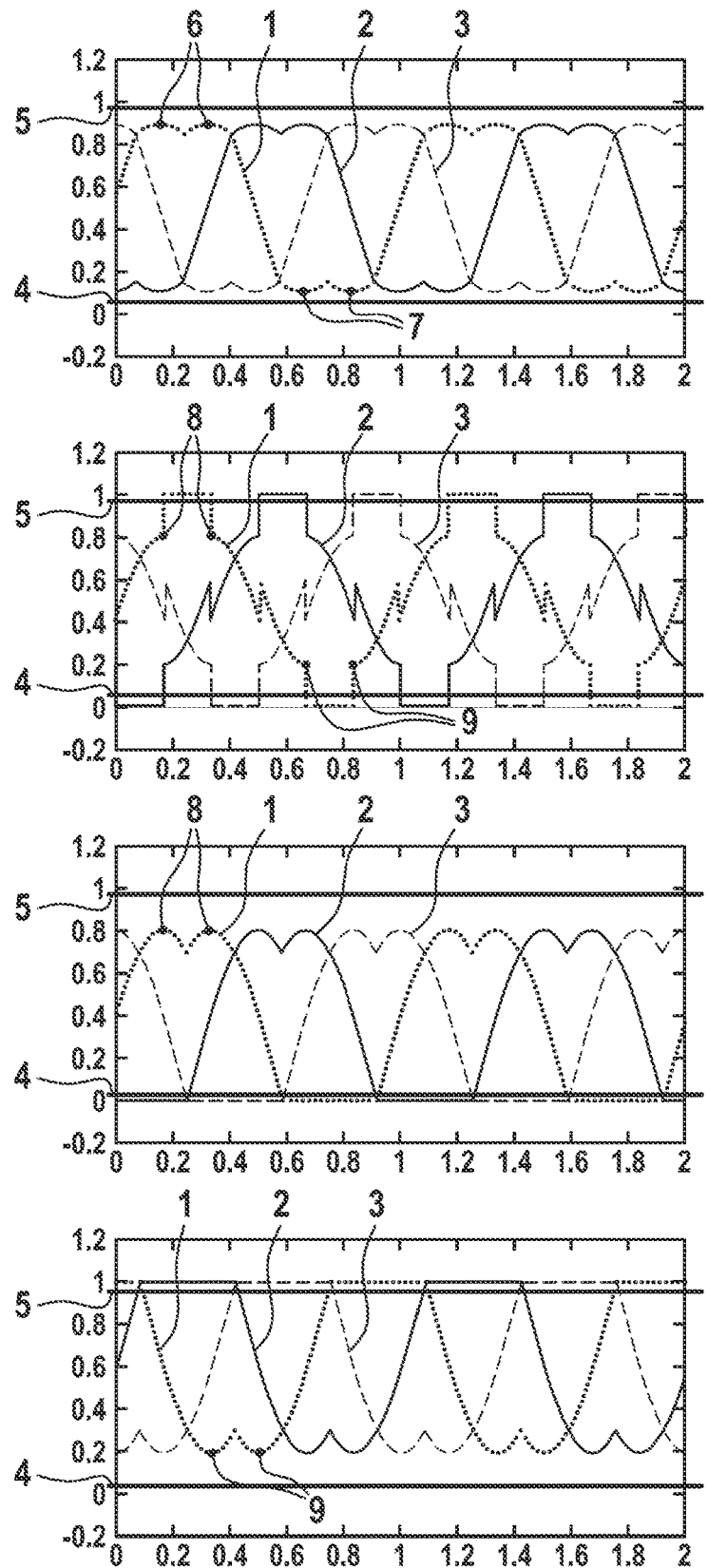
FIG. 3 shows a plurality of diagrams in which respective phase voltages applied to an electric machine of a drive device plotted over periods of a pulse width modulation, wherein an inverter electrically connected to the electric machine is operated with a continuous pulse width modulation, with a first discontinuous pulse width modulation, with a second discontinuous pulse width modulation, or with a third discontinuous pulse width modulation.

The FIG. 1 shows a motor vehicle 100 that includes a DC power source 102, an inverter 104, and a drive device 106 including an electric machine 108 electrically connected to the DC power source 102 via the inverter 104. FIG. 2 shows a flowchart of a method 200 that includes determining a duty cycle depending on a nominal value taking into account dead times of switches of the inverter at 202; determining whether the duty cycle is less than a threshold value at 204; if YES at 204, controlling the inverter with a continuous pulse width modulation at 206; and if NO at 204, controlling the inverter with a discontinuous pulse width modulation at 208, which may include implementing a clamping over a specific rotation angle range of the electric machine (e.g., 60° or 120°). FIG. 3 shows diagrams for phase voltages which are applied to an electric machine of a drive device for a motor vehicle. The phase voltages are provided by means of an inverter which is electrically connected on one side to a DC power source and on the other side to the electric machine. In other words, the electric machine is electrically connected to the DC power source via the inverter.

The inverter has a plurality of switches which are present, for example, as power transistors or the like. The inverter or its switches are controlled by means of pulse width modulation. The diagrams respectively show the curve of a first phase voltage with a curve 1, the curve of a second phase voltage with a curve 2, and the curve of a third phase voltage with a curve 3. The phase voltage is thereby respectively plotted relative to a rated voltage of the DC power source. A minimum voltage 4 and a maximum voltage 5 are also indicated. The minimum voltage is hereby more than 0, whereas the maximum voltage 5 is less than the rated voltage. This results from dead times of the inverter, or of the switches of the inverter.

In the uppermost diagram, the curves 1, 2, and 3 are shown for operation of the inverter with a continuous pulse width modulation. The curves 1, 2, and 3 of the second diagram from the top show the phase voltages for operation of the inverter with a first discontinuous pulse width modulation; those of the third diagram from the top with a second discontinuous pulse width modulation; and those of the diagram fourth from the top with a third discontinuous pulse width modulation.

In the context of the first discontinuous pulse width modulation, a clamping is provided over a rotation angle range of 60°, respectively over 120° for the second and third discontinuous pulse width modulation. It can be seen that the clamping takes place at a lower voltage level for the second discontinuous pulse width modulation and at a higher voltage level for the third discontinuous pulse width modulation. The former may be referred to as clampB− and the latter as clampB+. The first discontinuous pulse width modulation may also be referred to as a flat top.

In the uppermost diagram, for the first curve 1, points 6 are marked at which a maximum phase voltage occurs and points 7 are marked at which a minimum phase voltage is present. For example, at the duty cycle of 80% which is provided here, the points 6 have a certain distance from the maximum voltage and the points 7 have a certain distance from the minimum voltage 4.

For the diagrams in which the discontinuous pulse width modulation is shown, for curve 1 either points 8 and 9 at which said curve 1 exhibits a discontinuity are marked, or also points at which the maximum or minimum phase voltage occurs. In the former case, the points 8 and 9 each delimit the range of the curve 1 in which the clamping is implemented.

It can be seen that, for the discontinuous pulse width modulation, the points 8 are farther away from the maximum voltage 5 than the points 6 and, conversely, the points 9 are farther away from the minimum voltage than the points 7. This means that there is a greater linear modulation range due to the discontinuous pulse width modulation.

During operation of the drive device, it is now provided to implement the pulse width modulation depending on a predetermined duty cycle. If the duty cycle is less than a threshold value, the inverter is controlled with the continuous pulse width modulation. By contrast, if the duty cycle is greater than or equal to the threshold value, the discontinuous pulse width modulation is used to control the inverter. This may be selected from the three discontinuous pulse width modulations described herein. However, in principle any arbitrary embodiment of the discontinuous pulse width modulation is possible.

German patent application no. 10 2020 105163.8, filed Feb. 27, 2020, to which this application claims priority, is hereby incorporated herein by reference, in its entirety.

Aspects and features of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for operating a drive device for a motor vehicle, wherein the drive device has an electric machine which is electrically connected to a DC power source via an inverter, the method comprising:
   determining a duty cycle depending on a nominal value taking into account dead times of switches of the inverter;
   controlling the inverter with pulse width modulation based on the duty cycle, wherein the duty cycle is greater than 0 and less than 1;
   controlling the inverter with a continuous pulse width modulation when the duty cycle is less than a threshold value; and
   controlling the inverter with a discontinuous pulse width modulation when the duty cycle exceeds the threshold value.

2. The method according to claim 1, wherein the continuous pulse width modulation includes space vector modulation.

3. The method according to claim 1, further comprising implementing a clamping over a specific rotation angle range of the electric machine when the inverter is operated with the discontinuous pulse width modulation.

4. The method according to claim 3, wherein the clamping takes place over a rotation angle range of 60° or 120°.

5. The method according to claim 1, wherein, for a plurality of duty cycles, a first distortion value is determined for the continuous pulse width modulation and a second distortion value is determined for the discontinuous pulse width modulation, wherein a significant digit is set equal to that duty cycle for which the second distortion value indicates less distortion than does the first distortion value.

6. The method according to claim 1, further comprising using a distortion factor or a Weighted Total Harmonic Distortion value as a distortion value.

7. The method according to claim 1, wherein the threshold value is a first threshold value, the method further comprising switching from the discontinuous pulse width modulation to the continuous pulse width modulation when the discontinuous pulse width modulation falls below a second threshold value that is different from the first threshold value.

8. The method according to claim 1, further comprising:
   determining, from the dead times, a maximum duty cycle and a minimum duty cycle; and
   switching to the discontinuous pulse width modulation when the duty cycle reaches the maximum duty cycle or the minimum duty cycle.

9. A motor vehicle, comprising:
   a DC power source;
   an inverter; and
   a drive device including an electric machine electrically connected to the DC power source via the inverter, wherein the drive device, in operation, determines a duty cycle depending on a nominal value taking into account dead times of switches of the inverter, controls the inverter with pulse width modulation based on the duty cycle, wherein the duty cycle is greater than 0 and less than 1, wherein the drive device controls the inverter with a continuous pulse width modulation when the duty cycle is less than a threshold value, and wherein the drive device switches the pulse width modulation from the continuous pulse width modulation to a discontinuous pulse width modulation when the duty cycles exceeds the threshold value.

* * * * *